(12) United States Patent
Rupe et al.

(10) Patent No.: US 11,700,082 B1
(45) Date of Patent: Jul. 11, 2023

(54) SYSTEMS AND METHODS FOR PROACTIVE NETWORK MAINTENANCE

(71) Applicant: Cable Television Laboratories, Inc., Louisville, CO (US)

(72) Inventors: Jason W. Rupe, Lafayette, CO (US); Jingjie Zhu, Erie, CO (US); Karthik Sundaresan, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/706,840

(22) Filed: Mar. 29, 2022

Related U.S. Application Data

(63) Continuation of application No. 16/937,345, filed on Jul. 23, 2020, now Pat. No. 11,303,386.

(60) Provisional application No. 62/877,453, filed on Jul. 23, 2019.

(51) Int. Cl.
| | |
|---|---|
| *H04L 12/26* | (2006.01) |
| *H04L 1/00* | (2006.01) |
| *H04L 41/14* | (2022.01) |
| *G06N 20/00* | (2019.01) |
| *H04L 41/142* | (2022.01) |
| *H04L 67/30* | (2022.01) |
| *H04B 1/38* | (2015.01) |
| *H04L 43/08* | (2022.01) |

(52) U.S. Cl.
CPC ........... *H04L 1/0019* (2013.01); *G06N 20/00* (2019.01); *H04B 1/38* (2013.01); *H04L 1/0003* (2013.01); *H04L 1/0009* (2013.01); *H04L 41/142* (2013.01); *H04L 41/145* (2013.01); *H04L 43/08* (2013.01); *H04L 67/30* (2013.01)

(58) Field of Classification Search
CPC ... H04L 1/0019; H04L 1/0003; H04L 1/0009; H04L 41/142; H04L 41/145; H04L 43/08; H04L 67/30; H04L 47/10; H04L 43/50; H04L 12/2697; H04L 43/0852; H04L 43/00; G06N 20/00; H04B 1/38
See application file for complete search history.

(56) References Cited

U.S. PATENT DOCUMENTS

| | | | | |
|---|---|---|---|---|
| 6,957,257 | B1 * | 10/2005 | Buffalo | G06F 11/0748 709/200 |
| 7,225,139 | B1 * | 5/2007 | Tidwell | G06Q 10/063114 705/7.15 |
| 7,925,911 | B2 * | 4/2011 | Brey | G06F 1/3203 713/340 |
| 10,052,026 | B1 | 8/2018 | Tran | |
| 10,970,891 | B2 | 4/2021 | Garvey et al. | |
| 2004/0179654 | A1 * | 9/2004 | Boetje | H04M 3/22 379/9.03 |

(Continued)

OTHER PUBLICATIONS

Zhu et al., Proactive Network Maintenance using Fast, Accurate Anomaly Localization and Classification on 1-D Data Series, Jul. 17, 2020, IEEE, pp. 1-11 (Year: 2020).*

*Primary Examiner* — Phuongchau Ba Nguyen
(74) *Attorney, Agent, or Firm* — Elevated IP, LLC

(57) ABSTRACT

The present disclosure generally relates to systems, methods and software for quantitatively evaluating an improvement on an active communication network when an impairment, such as a developing impairment, is addressed by one or more repair options via proactive network maintenance.

18 Claims, 6 Drawing Sheets

(56) References Cited

U.S. PATENT DOCUMENTS

| | | | |
|---|---|---|---|
| 2008/0178018 A1* | 7/2008 | McGrane | G06F 1/3203 713/340 |
| 2009/0113221 A1* | 4/2009 | Hoile | G06F 1/189 713/310 |
| 2009/0138734 A1* | 5/2009 | Uchida | H04L 41/0893 713/310 |
| 2017/0141887 A1 | 5/2017 | Garcia et al. | |
| 2018/0102868 A1 | 4/2018 | Sundaresan et al. | |
| 2019/0305876 A1 | 10/2019 | Sundaresan et al. | |
| 2020/0389239 A1 | 12/2020 | Garcia et al. | |
| 2021/0091989 A1 | 3/2021 | Zaltsman et al. | |

* cited by examiner

SYSTEMS AND METHODS FOR PROACTIVE NETWORK MAINTENANCE

CROSS-REFERENCE TO RELATED APPLICATIONS

This application is a continuation of U.S. patent application Ser. No. 16/937,345, filed Jul. 23, 2020, which application claims the benefit of and priority to U.S. Provisional Patent Application No. 62/877,453, filed Jul. 23, 2019, which is hereby incorporated by reference in its entirety.

STATEMENT REGARDING FEDERALLY SPONSORED RESEARCH

None.

BACKGROUND

The field of this disclosure relates generally to digital transmission systems, and more particularly, to multi-carrier wired, wireless, and optical digital transmission systems.

Data Over Cable Service Interface Specification, version 3.1 (DOCSIS 3.1) is one of many known communications standards. DOCSIS 3.1 changed the nature of information delivery across cable plants in fundamental ways, as well as the hybrid fiber coaxial (HFC) networks that implement DOCSIS. In recent HFC developments, the downstream channel no longer employs a one-size-fits-all modulation scheme, and instead it optimizes the modulation and forward error correction based on actual plant conditions at individual devices. This more customized approach allows, on the same channel, devices that receive an exceptionally "clean" signal to utilize more efficient high-order-modulation, but devices that receive a degraded signal to utilize more robust modulation.

Robust modulation, however, wastes significant bandwidth, which affects the quality of service to all users of a channel and decreases an operator's ability to service more customers with existing infrastructure. Therefore, it would be desirable to have the poor performing devices on a channel utilize a higher order modulation to better utilize capacity. This may be accomplished by replacing the baseline modulation profile with a more efficient profile, but such changes often require network maintenance in the form of repairs and/or hardware replacement.

Proactive network maintenance (PNM) involves monitoring performance data of a network to identify developing impairments and request maintenance (i.e., repairs and/or hardware replacement) prior to network failure. Lost capacity may be used as a way to measure the severity of impairments, but prioritizing PNM on this basis oversimplifies the interdependent factors affecting network performance. When attempting to quantify the impact of a maintenance change, it is not enough to consider the impact on a single user because an impairment that shows up in PNM statistics for a single cable modem (CM), say an inside wire problem, can still impact other CMs through profile impacts. For example, a single CM requiring a low modulation may force other CMs to lower their capabilities to share a profile, and the needed profile itself is a constrained resource which could otherwise be given to a different modulation profile thus benefitting a larger set of CMs that do not even share the profile of the single CM. Therefore, methods of analyzing profile management and network maintenance impacts of a proposed repair for a set of CMs are needed.

SUMMARY

The present disclosure generally relates to systems, methods and software for quantitatively comparing an overall capacity improvement for a channel used for downstream and/or upstream transmissions to and from a population of user devices when an existing profile is replaced with a proposed profile. Additionally, the quantitative comparison can be used to prioritize profile changes and/or network maintenance.

The methods disclosed herein do not simply assign one affected CM a new profile. Instead the methods reevaluate all CMs impacted by removal of an impairment, then reevaluate the profiles for the group, and assign the optimal profiles based on the updated data. Thus, not only may the CMs impacted by the impairment that is to be removed be affected but all CMs assigned profiles by the same CMTS have the potential of being assigned new profiles—even CMs that did not previously share a profile with the impacted CMs. This means that unimpaired or even differently impaired CMs may receive better or worse profiles, but overall channel capacity will be improved.

In an aspect, a method for comparing profiles for transmissions over a channel to or from a population of user devices, the transmission including a plurality of subcarriers, comprises determining a first metric representing capacity of user devices using a first profile versus capacity of user devices using a baseline modulation profile; selecting a second profile to replace the first profile; modeling channel measurement data based on the second profile; and calculating, based on the modeled channel measurement data, a second metric representing capacity of user devices using the second profile versus capacity of user devices using the baseline modulation profile.

In an embodiment, modeling channel measurement data comprises: (i) altering the original channel measurement data based on historical parameters, (ii) applying probabilistic filters to the original channel measurement data, (iii) using machine learning techniques to alter the original channel measurement data, (iv) replacing segments of data within the original channel measurement data, (v) using data smoothing techniques or missing data replacement techniques or combinations thereof. For example, subcarriers using the first profile may be identified as impacted subcarriers and the impacted subcarrier data may be replaced with ideal data or smoothed, e.g., by statistical methods, such as averaging, moving average, sliding window average, median, least mean squares, fft-smooth-ifft methods, or others. One reasonable approximation is to assign new RxMER values over affected subcarriers that are an average of the non-affected subcarriers, or a target value for the subcarriers, or, for impairments like waves, to assign the average of affected subcarriers.

In an embodiment, a method for comparing profiles further comprises performing one or more of cost-benefit analysis, proactive network maintenance (PNM) analysis, and profile management application (PMA) analysis. Although PMA information can be used as the sole means for selecting PNM work, it is also possible to combine PMA information with other criteria, such as signal to noise, data throughput, weather, likelihood of a hard failure, data rate guaranteed by the product purchased by the affected customers, expected cost of repair, and potential to cluster repair work or with other work in the area. Accordingly, the systems, methods and software disclosed herein enable complex analysis of interdependent variables. As an illustration, a single PMA solution may provide more than one (roughly) equal set of profiles, only one of which can be installed. However, when PNM opportunities are taken into consideration a given repair or repairs may create a greater net positive impact on customers overall if one profile set is selected over another profile set, thereby enabling selection of the best profile set for customer satisfaction. As another illustration, it may be possible to install one of the roughly equal profile sets without performing PNM, thereby reducing costs, and enabling selection of the most economical profile set.

In an embodiment, a method for comparing profiles further comprises replacing the first profile with the second profile when the second metric exceeds the first metric by a set amount.

In an embodiment, a method for comparing profiles further comprises calculating a comparative value of the first metric and the second metric. For example, the comparative value may be calculated as: (i) a difference between the first metric and the second metric, (ii) a ratio of the first metric and the second metric, (iii) a percent change between the first metric and the second metric, or by other comparative mathematical models. In an embodiment, the comparative value is combined with other measurements or taken as input to a set of measurements.

In an embodiment, a method for comparing profiles further comprises using the comparative value to prioritize network maintenance and/or profile changes within a profile management application (PMA), or other network adjustments, such as in measuring network health, prioritizing long term investments, determining services to offer, or making other business decisions for communication services.

In an embodiment, a method for comparing profiles comprises receiving PNM data to inform PMA. For example, PNM data indicating a new impairment or that a network impairment has been removed may trigger profile comparisons in order to find the best available profile for transmission on the newly impaired or newly unimpaired network.

In an embodiment, a method for comparing profiles further comprises receiving channel measurement data from each user device of the population for each of the plurality of subcarriers; calculating, from the received channel measurement data, a bit-loading value for each user device; and determining a first total channel capacity based on the number of user devices and the bit-loading value for each user device.

In an embodiment, the population of user devices is a service level group, a geographic group or a shared infrastructure group.

In an embodiment, received channel measurement data is downlink or uplink modulation error ratio (RxMER) data, signal-to-noise data, or other performance data.

In an embodiment, the transmission comprises a DOCSIS format or a unicast transmission.

In an aspect, a transmission system for transmitting a plurality of active subcarriers over a channel, comprises a cable modem termination system (CMTS) configured to define a plurality of profiles, wherein each of the plurality of profiles includes a particular modulation order; a plurality of cable modems in operable communication with the cable modem termination system; and a processor executing non-transitory instructions for comparing profiles by: determining a first metric representing capacity of user devices using a first profile versus capacity of user devices using a baseline modulation profile; selecting a second profile to replace the first profile; modeling channel measurement data based on the second profile; and calculating, based on the modeled channel measurement data, a second metric representing capacity of user devices using the second profile versus capacity of user devices using the baseline modulation profile.

In an embodiment, a transmission system further comprises a profile management unit (PMU) configured to receive channel measurement data from each of the cable modems and to replace the first profile with the second profile when the second metric exceeds the first metric by a set amount.

In an embodiment, a transmission system further comprises a profile management unit (PMU) configured to determine a capacity improvement from replacing the first profile with the second profile, to prepare a service cost estimate for infrastructure work necessary for the CMTS to transmit the second profile, and to send a service request when the capacity improvement exceeds the service cost estimate by a set amount (i.e., exceeds a threshold).

In an aspect, a transmission system for transmitting a plurality of active subcarriers over a channel, comprises: a cable modem termination system configured to define a plurality of profiles, wherein each of the plurality of profiles includes a particular modulation order; a plurality of cable modems in operable communication with the cable modem termination system; a processor executing non-transitory instructions for modelling channel measurement data of a proposed profile and generating a theoretical total channel capacity; and a profile management unit configured to receive channel measurement data from each of the cable modems and to determine a capacity improvement from replacing an existing profile with the proposed profile, to prepare a service cost estimate for infrastructure work necessary for the CMTS to transmit the proposed profile, and to send a service request when the capacity improvement exceeds the service cost estimate by a set amount. In an embodiment, a PMU is further configured to replace an existing profile with the proposed profile when no infrastructure work is necessary for the CMTS to transmit the proposed profile. In an embodiment, the processor calculates a comparative value of the actual channel capacity and the theoretical total channel capacity.

In an embodiment, the processor is disposed within the profile management unit. In an embodiment, the processor and/or the profile management unit is disposed within the cable modem termination system or externally to the cable modem termination system.

In an aspect, a non-transitory computer-readable medium has a plurality of non-transitory instructions executable with a processor for comparing profiles for a transmission over a channel to and from a population of user devices, the transmission including a plurality of subcarriers, the plurality of non-transitory instructions being executable for: determining a first metric representing capacity of user devices using a first profile versus capacity of user devices using a baseline modulation profile; selecting a second profile to replace the first profile; modeling channel measurement data based on the second profile; and calculating, based on the modeled channel measurement data, a second metric representing capacity of user devices using the second profile versus capacity of user devices using the baseline modulation profile.

In an embodiment, the plurality of non-transitory instructions are further executable for calculating a comparative value of the first metric and the second metric.

In an embodiment, the plurality of non-transitory instructions are further executable for using the comparative value to prioritize network maintenance (PNM) and/or profile changes within a profile management application (PMA).

In an embodiment, the plurality of non-transitory instructions are further executable for replacing the first profile with the second profile when the second metric exceeds the first metric by a set amount.

BRIEF DESCRIPTION OF THE DRAWINGS

Illustrative embodiments of the present invention are described in detail below with reference to the attached drawings.

Figure 1:
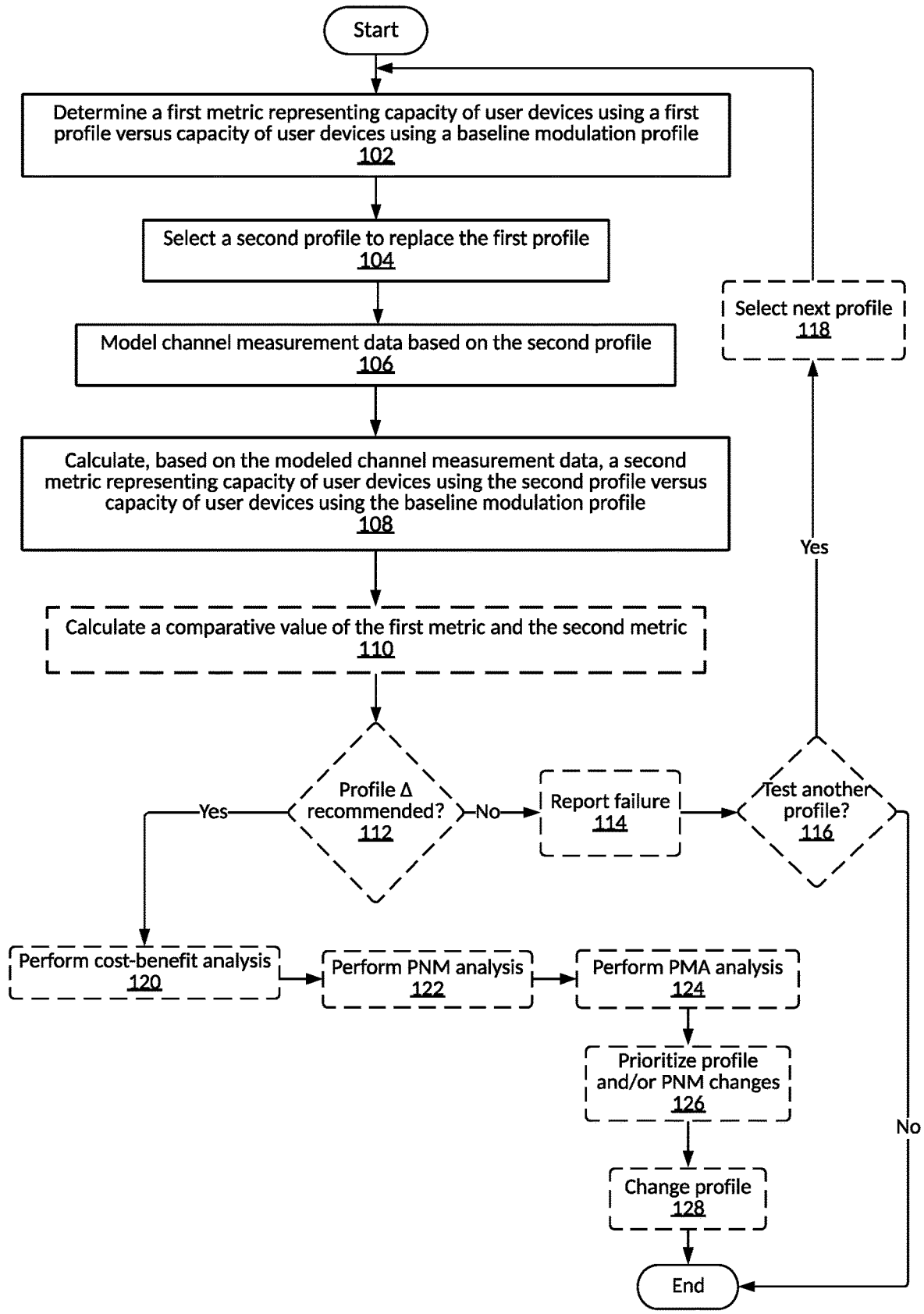
FIG. 1 is a flowchart illustrating steps in a method for comparing profiles for a transmission over a channel to a population of user devices, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, a "profile" is a specific configuration of modulation orders for each subcarrier in the OFDM channel. A profile allows the channel to operate at a higher modulation order in clean parts of the spectrum and then switch to more robust (lower) modulation orders when there is interference present.

As used herein, a "baseline modulation profile" is a profile that accommodates all active cable modems on a channel. Methods for computing a baseline modulation profile, such as Profile A, are disclosed, for example, in U.S. patent application Ser. No. 15/729,058 (US Pat. Pub. No. 2018/0102868) and Ser. No. 16/377,030, each of which is hereby incorporated by reference in its entirety.

As used herein, proactive network maintenance (PNM) data is any data useful for detecting impairment and/or impending failure conditions on a network, such as but not limited to bandwidth demand, collision frequency, a limit on a resource necessary to provide service, time of day, temperature, other environmental conditions, location of a device, movement of a failure condition (transience), and the like.

As used herein, modulation error ratio (MER) data quantifies the performance of a digital transmitter or receiver in a network. For example, imperfect digital signals may include noise, carrier suppression, distortion and other features that can be observed when the digital signal is demodulated. Thus, MER data may be characterized as one type of PNM data.

The hub is any system (e.g., a cable modem termination system (CMTS)), device, software, or combination thereof, typically located in a cable company's hub site, or "headend", which is used to provide high speed data services (i.e., downstream and upstream transmissions), such as cable Internet and Voice over Internet Protocol. The channels are generally network bridges and modems that provide bi-directional data communication via radio frequency channels on a Hybrid Fiber-Coaxial (HFC) or Radio Frequency over Glass (RFoG). The channels are used to deliver broadband Internet access in the form of cable Internet, taking advantage of the high bandwidth of a HFC and RFoG network.

The hub is operable to configure the channels to communicate via a specific protocol (e.g., Data Over Cable Service Interface Specification, or "DOCSIS") specification. In this regard, the hub is operable to send control signals that direct the channels to operate in a particular manner with respect to the employed protocol. In an embodiment, the hub is operable to transmit a profile or set of profiles to a plurality of user devices on a channel.

In an exemplary embodiment, systems and methods are provided to optimize modulation profiles for individual end user devices, such as cable modems (CMs), or sets of CMs, and also to select optimum modulation profiles thereof. DOCSIS OFDM profiles include a wide range of modulation choices that maybe implemented to fine tune a CM's transmission to achieve the best possible performance over given network conditions. The present embodiments therefore provide techniques to realize a well designed and optimized set of modulation profiles. Systems and methods according to these techniques thereby advantageously allow a channel to operate with a lower SNR margin, which in turn allows a particular channel to operate at an overall higher throughput.

Systems and methods for designing OFDM profiles implemented with DOCSIS, and for selecting the appropriate modulation orders for a particular profile are described in US Patent Pub. No. 2018/0102868, which is incorporated in its entirety by reference herein.

Modulation Profiles

Each of the subcarriers in the OFDM channel may be configured to use a different modulation order, thereby allowing the CMTS to optimize transmissions across the frequency band (e.g., 192 MHz) of the channel. The specific choice of modulation order, selected for each subcarrier, is communicated to the CMs in the form of a modulation profile, which thus allows the CMs to interpret and demodulate the signal.

A typical DOCSIS modulation profile includes a vector of bit-loading values, that is, an integer value for each active subcarrier in the channel. For modulation orders ranging from 16-QAM to 16384-QAM, the bit-loading values of the vector may then range from 4 to 14 (skipping 5). In practice though, it is expected that low bit-loading values (e.g., 7 or less) will be used infrequently since most plants support at least 256 QAM at present.

In an exemplary embodiment, the CMTS generates a "Profile A" for the CMs in a particular Service Group. Profile A then functions as the lowest common denominator profile, and may be successfully received by all CMs in the Service Group. The CMTS may then generate up to 15 additional modulation profiles, which may also be communicated to the Service Group. Each CM may then be assigned up to four modulation profiles, including Profile A (used for broadcast frames), an optimized profile for the CM's unicast traffic, and possibly two additional profiles that may be used for multicast traffic. In practice, since the number of CMs in a Service Group is expected to be greater than 15 (in a majority of cases), it is expected that each profile will be used by a group of CMs that have similar channel characteristics.

This capability of the system, to optimize transmissions for the channel characteristics of the CM population, allows the present embodiments to achieve a significant improvement in channel capacity, while simultaneously improving RF plant maintenance. Before the advent of DOCSIS 3.1, all traffic had been transmitted (i) using the lowest common denominator modulation (e.g., 64-QAM or 256-QAM), (ii) setting the channel capacity to a fixed value, and (iii) setting an MER target for plant maintenance. Under DOCSIS, however, only a fraction of the traffic will be carried using the Profile A and, since the CMTS is capable of automatically determining the modulation to use for that profile, there is no longer a single MER target. Furthermore, since CMs may now be assigned to modulation profiles that are optimized for their channel conditions, there is also no longer a fixed value for channel capacity.

Accordingly, the cleaner the channel is with respect to a particular CM, the more efficient the CM's traffic becomes, thereby raising the overall average efficiency, and hence, capacity, of the channel. The present systems and methods advantageously capitalize on this capability by providing the CMTS the ability to quantitatively assess capacity gain and cost of proposed profile changes and associated network maintenance.

Profile Creation

For a population of user CMs, each user places data on the channel at a rate of b bits-per-second. Accordingly, each user profile will similarly place profile data on the channel at a rate of Nx*b bits-per-second, where Nx is the number of users assigned to profile x. This data rate thus equates to a symbol rate Sx namely, for the profile x, Sx=Nxb/Kx symbols-per-second, where Kx is the total efficiency of profile x (i.e., the sum of the bit-loading values of all of the subcarriers). The total channel symbol rate S is therefore the sum of the symbol rates Sx of all of the profiles. For purposes of this discussion, these calculations are simplified to disregard the forward error correction (FEC), as well as overhead incurred by the use of multiple profiles, such as additional NCP blocks, partial codewords. The total channel rate S may therefore be represented according to the following equations:

$$S = \sum_{\forall x} S_x \quad \text{(Eq. 1)}$$

$$S = b \cdot \sum_{\forall x} \frac{N_x}{K_x} \quad \text{(Eq. 2)}$$

Where b represents the per user bit rate for a fully loaded channel. Accordingly, since the symbol rate S of the channel is a parameter typically set by the operator (e.g., 50 ksym/s or 25 ksym/s), the per user bit rate b, for a fully loaded channel, may be derived according to the equation:

$$b = s \Big/ \sum_{\forall x} \frac{N_x}{K_x} \quad \text{(Eq. 3)}$$

Total channel capacity C is calculated as: C=N*b, where N is the total number of users expressed according to the following equation:

$$C = NS \Big/ \sum_{\forall x} \frac{N_x}{K_x} \quad \text{(Eq. 4)}$$

Or alternatively as:

$$C = S \Big/ \sum_{\forall x} \frac{\phi_x}{K_x} \quad \text{(Eq. 4)}$$

Where $\phi_x = N_x/N$ is the fraction of users assigned to profile x.

Accordingly, the harmonic mean (across all CMs) of each CM's single-user channel capacity is thus calculated.

As described above, DOCSIS includes the notion of a baseline modulation profile, referred to as "Profile A" that can be utilized by all CMs in the service group. In practice, it is mandatory that a Profile A be created (e.g., for broadcast data, at a minimum), to provide a useful metric J to assess the utility of a set of candidate profiles P, where $J_{P,A}$ is the ratio of the channel capacity $C_P$ using the set of candidate profiles P to the channel capacity $C_A$ only using profile A.

This ratio metric J is represented according to the following equations:

$$J_{P,A} = C_P / C_A \quad \text{(Eq. 5)}$$

$$J_{P,A} = \frac{s \Big/ \sum_{\forall x} \frac{\phi_x}{K_x}}{s \Big/ \frac{1}{K_A}} \quad \text{(Eq. 6)}$$

Where $K_A$ is the efficiency of Profile A. These equations may be further reduced to:

$$J_{P,A} = \frac{1}{K_A \cdot \sum_{\forall x \in P} \frac{\phi_x}{K_x}} \quad \text{(Eq. 7)}$$

Accordingly, the following embodiments advantageously accomplish the objective to select a particular set of profiles P that maximizes the metric $J_{P,A}$ for the Service Group.

Profile Optimization

In accordance with several embodiments described herein, the PMA may implement one or more of the following methods, processes, subprocesses, and/or algorithms to select the optimal set of profiles.

Comparing the J value of an existing profile to the J value of a proposed profile, e.g., using a relative J value or related measure of performance, allows the impact of a maintenance change, including PNM, to be quantified before and/or after performing the maintenance.

While quantification could be done for a single CM as a bandwidth potential such as the amount of added bandwidth due to the repair, or the percentage of added bandwidth compared to the previous amount or a maximum possible, such an approach ignores the impact of an improvement on a whole set of CMs due to profile improvement for the population. As discussed earlier, an impairment that shows up in PNM statistics for a single CM, say an inside wire problem, can still impact other CMs through profile impacts. A single CM requiring a low modulation may force other CMs to lower to their capabilities to share a profile, and the needed profile itself is a constrained resource which could otherwise be given to a different modulation profile thus benefitting a larger set of CMs that do not even share the profile of the single CM. Thus, it is important to reflect the impact of an impairment to be repaired as it impacts the entire set of CMs in a group (with group defined as the CMs sharing profiles from a CMTS).

As a beginning, consider a single CM. For a single CM using a profile P, which puts data on the channel at $b_{CM}$ bits per second, $S_{p,CM}=b/K_p$ symbols/second, where $K_p$ is the efficiency of profile p. If $b_{CM}$ is not known, or is highly variable, then it may be convenient and sufficient to just use an average of $b_{CM}$ over time or for all CMs in the group, simply b. Note then that $1/K_p$ is a sufficient measure for the single CM. But recall we need to understand the impact on the entire group of CMs.

The following defines the measures that are important for the group of CMs. Simply defined, a measure of total channel capacity is $C=N*b$, with N being the total number of users on the channel. It is then possible to calculate channel capacity for various profiles, and form a metric J as a comparison for profiles. For profile p, for example, the J measure would be $J_{p,a}=C_p/C_a$.

A comparative J factor may be formed as the before-repair J factor compared to the after-repair J factor. There are a couple ways to define this difference. First, define the current, before-repair J factor as $J_{p,a}$ and the potential future after-repair J factor as $J'_{p,a}$, which is assumed to be higher in value generally than the current value. Then three useful measures are: 1) $J'_{p,a}-J_{p,a}$, 2) $J'_{p,a}/J_{p,a}$, and 3) $J'_{p,a}-J_{p,a}/J_{p,a}$. Note that other useful measures exist, some being extensions of these three values.

By using a PMA implementation, the calculated (optimized) $J_{p,a}$ for the service group is referenced, the calculation for the PMA implementation is duplicated with data adjusted by assumed improvements from a repair to yield $J'_{p,a}$, and then a value is placed on the repair as one of the three options above.

Exemplary process steps would be as follows for a given repair option, defined as one or more impairments on a service group.
1. Read $J_{p,a}$ from the PMA for the service group.
2. Read the RxMER values used to find $J_{p,a}$.
3. Identify the subcarriers that would be impacted by the assumed repair option. Model the change in RxMER that can be expected by the repair option (RxMER').
4. Use the same PMA as in the first step to calculate a theoretical $J'_{p,a}$ based on the modeled impacted RxMER' values.
5. Calculate the Comparative J factor CJ using one of the three measures above, or a variant thereof.
6. Use the CJ for this repair option work package to assign a value to the work, as a way to prioritize the work in the work ticketing system.

Additional exemplary systems, methods and process steps are further described with reference to the drawings.

FIG. 1 is a flowchart illustrating exemplary steps in a method for comparing profiles for a transmission over a channel to a population of user devices. In step 102, a first metric representing capacity of user devices using a first profile versus capacity of user devices using a baseline modulation profile is determined. For example, the J value may be reported by the PMA. In step 104, a second profile is selected as a candidate to replace the first profile. Channel measurement data, such as RxMER data reported by the PMA for each user device using the first profile, is modeled for the second profile, in step 106. For example, portions of the RxMER data exhibiting anomalies or interference may be replaced or smoothed to simulate improvements made by the second profile. In step 108, a second metric is calculated, based on the modeled channel measurement data, e.g., by reprocessing the simulated RxMER' data by the PMA. The second metric (e.g., J') represents capacity of user devices using the second profile versus capacity of user devices using the baseline modulation profile. By utilizing metrics that account for the fraction of users operating on the baseline modulation profile, it is possible to avoid profiles that provide an overall capacity improvement by delivering exceptional service to a few users by demoting many users to the baseline modulation profile.

In optional step 110, a comparative value (e.g., CJ) of the first metric and the second metric is calculated to quantify the theoretical improvement associated with replacing the first profile with the second profile. Step 112 is a query asking whether a profile change is recommended. For example, a profile change may be recommended when the theoretical improvement meets or exceeds a threshold. If the answer to query 112 is no, a failure notification may be reported in step 114. If another profile is to be tested, and the answer to query 116 is yes, the next profile is selected in step 118 and the process begins again with step 102. If the answer to query 116 is no, the method ends. If a profile change is recommended, additional analysis may be performed to factor other considerations into the final profile selection. For example, cost-benefit analysis (step 120), PNM analysis (step 122) and/or PMA analysis (step 124) may be performed. Examples of these analysis steps are described in greater detail in FIGS. 2-4. In optional step 126, profile changes may be prioritized, for example, based on the comparative metric obtained in step 110, proximity to otherwise scheduled work, number of customers impacted by the change, or other factors. In step 128, the profile change is made then the method ends.

Figure 2:
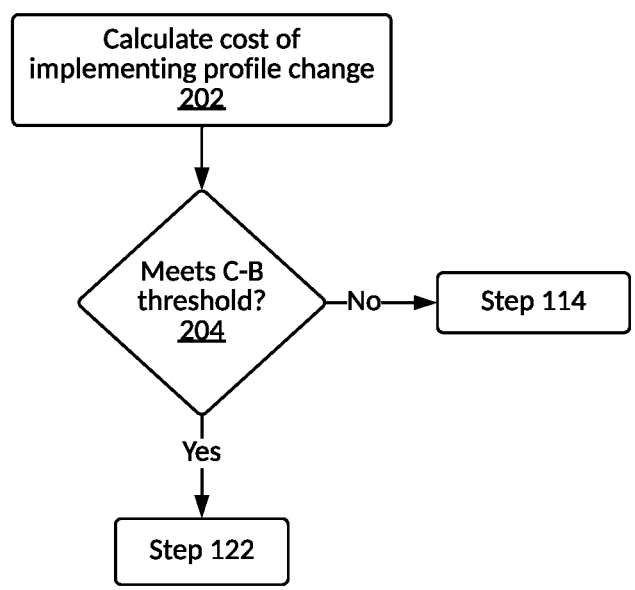
FIG. 2 is a flowchart providing detail of cost-benefit analysis in the comparison of profiles, according to an embodiment.

FIG. 2 is a flowchart providing greater detail of cost-benefit analysis (step 120 of FIG. 1) in the comparison of profiles. In step 202, the cost of implementing a proposed profile change is calculated. This cost estimate may take various factors into account including, but not limited to, equipment costs, labor costs, fuel costs, ability to bundle PNM work with other work tickets, service level agreement pricing and/or ability to add new users to a channel after the proposed change. Query 204 asks whether the cost of implementing the proposed change versus the benefit (e.g., from step 110) meets or exceeds a threshold. If the answer is no, and passage of the cost-benefit analysis is mandatory, the method reverts to step 114 to optionally report a failure. If meeting the cost-benefit threshold is not mandatory, a failure notification may be provided and then further steps (as shown in FIG. 1) performed. If the answer to query 204 is yes, further steps, such as PNM analysis (step 122), PMA analysis (step 124), prioritization of profile and/or PNM changes (step 126) and/or changing the profile (step 128) may be performed before the process ends.

Figure 3:
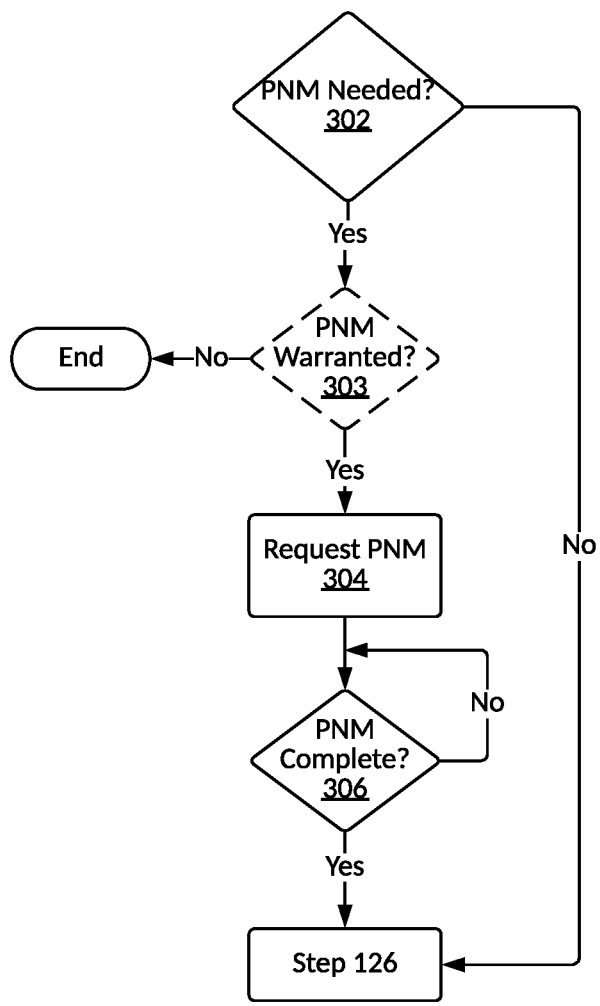
FIG. 3 is a flowchart providing detail of proactive network maintenance (PNM) analysis in the comparison of profiles, according to an embodiment.

FIG. 3 is a flowchart providing greater detail of proactive network maintenance (PNM) analysis (step 122 of FIG. 1) in the comparison of profiles. Step 302 is a query asking whether physical maintenance of the network is necessary to implement the proposed profile change. If the answer is no, the method proceeds to step 126. If the answer is yes, an additional optional query (step 303) asks whether PNM is warranted. This decision may consider cost, upcoming infrastructure changes, and other criteria. If the answer to query 303 is no, the method ends. If network maintenance is necessary, and optionally warranted, PNM is requested in step 304. For example, a work ticket for the maintenance may be created and sent to a scheduler. Query 306 asks whether the PNM has been completed. For example, the PNM system may check the work ticket for an indication of completion. If the answer to query 306 is no, the method enters a holding pattern. If the answer to query 306 is yes, the method proceeds with further steps, such as PMA analysis (step 124), prioritization of profile and/or PNM changes (step 126) and/or changing the profile (step 128) before the process ends.

Figure 4:
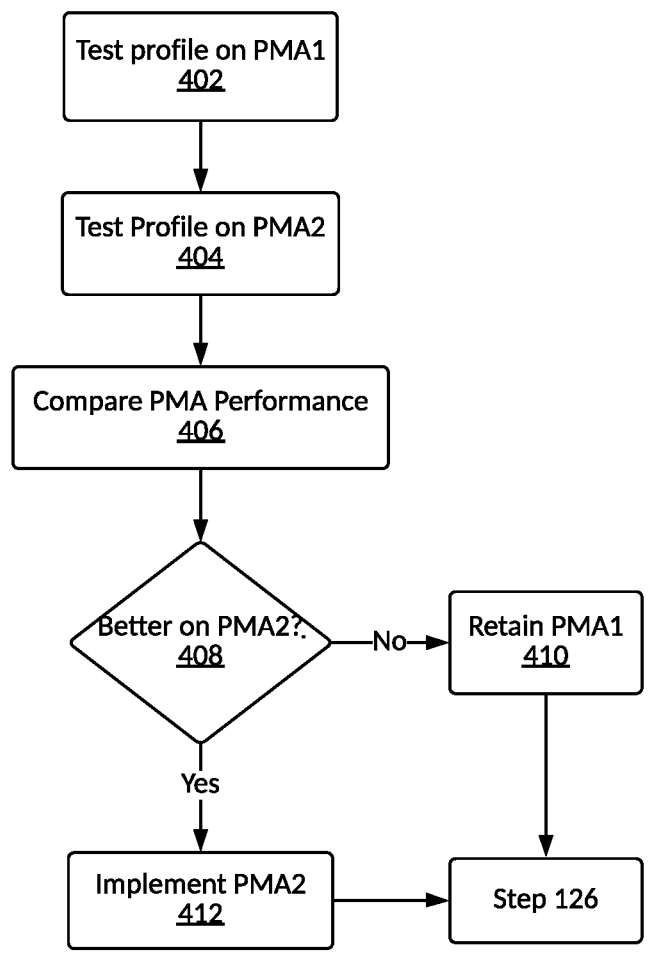
FIG. 4 is a flowchart providing detail of profile management application (PMA) analysis in the comparison of profiles, according to an embodiment.

FIG. 4 is a flowchart providing greater detail of profile management application (PMA) analysis (step 124 of FIG. 1) in the comparison of profiles. Step 402 includes testing the proposed profile on a first PMA. When the first PMA (PMA1) is the existing PMA, this step is performed as part of step 108. In step 404, the proposed profile is tested on a different PMA (PMA2), and the results of the tests are compared in step 406. Query 408 asks whether PMA2 provides better results than PMA1. If the answer is no, PMA1 is retained in step 410. If the answer is yes, PMA2 is implemented in step 412. The method then continues with further steps, such as prioritization of profile and/or PNM changes (step 126) and/or changing the profile (step 128) before the process ends.

Although the steps in FIGS. 1-4 are presented and described in a particular order, it should be understood that changes in the order of steps performed, the addition of other steps, omission of optional steps, and other changes may be made without departing from the scope of methods described herein.

Figure 5:
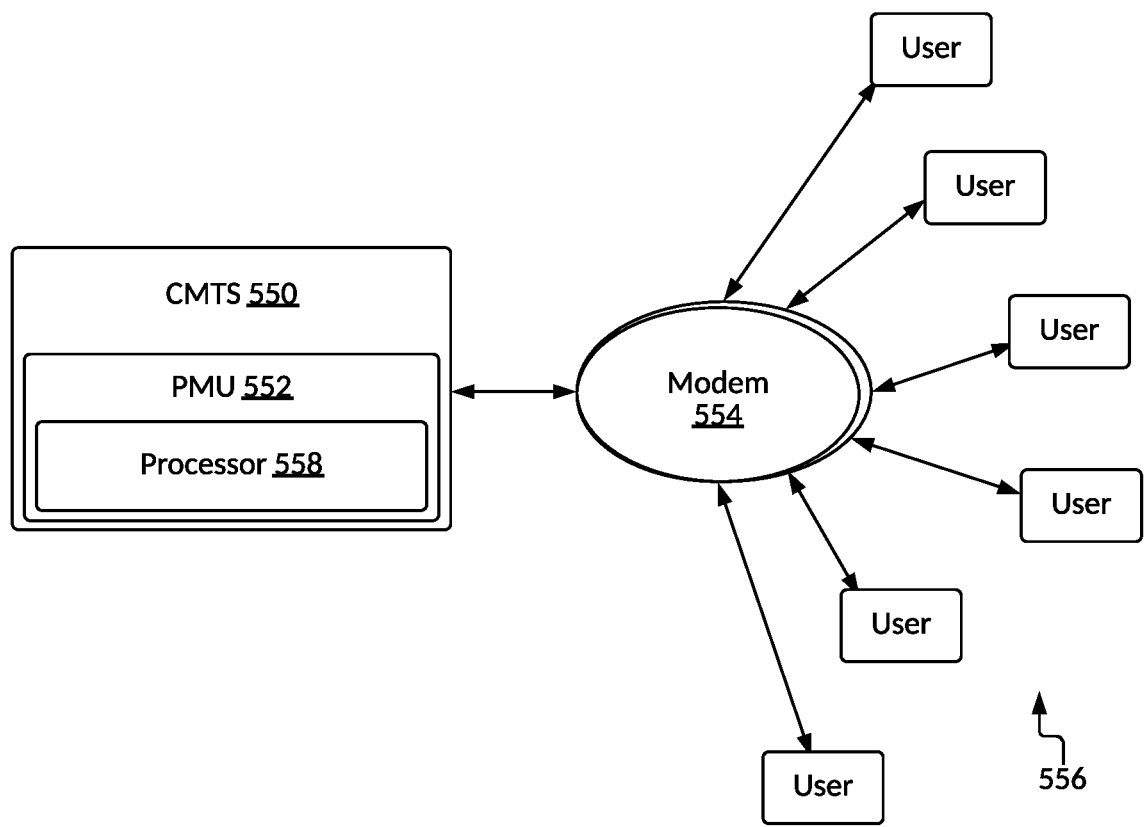
FIG. 5 is a block diagram of an exemplary system for performing methods described herein.

FIG. 5 is a block diagram of an exemplary system for performing methods described herein. For example, the system may include a cable modem termination system (CMTS) 550 configured to transmit a plurality of profiles to a plurality of cable modems 556 that are in operable communication with the CMTS via a cable access network 554. The cable access network 554 may include a combination of optical fiber and/or coaxial cables, amplifiers, and electrical/optical converters. A profile management unit (PMU) 552 is depicted as being disposed within the CMTS, but it should be recognized that the PMU may be implemented as a separate device from CMTS 550. The PMU 552 is configured to receive channel measurement data (e.g., RxMER data) from each of the cable modems, to generate profiles for the population of cable modems, to identify segments of subcarriers using a particular profile and to replace profiles. For example, a proposed profile may be selected by the PMU and/or a human. In an embodiment, PMU 552 comprises a processor 558 trained to recognize anomalies in channel measurement data and to factor the type of anomaly into profile selection. For example, when a human or machine recognizes an intermittent impairment, a more robust profile with a lower bit loading may be preferred.

In an exemplary embodiment, a software application is provided to implement optimization logic that, when executed by one or more processors of a device or transmission system, accomplishes the processes and subprocesses described herein. In some embodiments, the software application is stored and executed within a cable modem termination system (CMTS). In other embodiments, the application is external to the CMTS. When executed, the logic of the software application advantageously enables efficient utilization of profiles across channels and CMs. In some embodiments, the application is implemented by an operator, and allows uniform operation of algorithms across different CMTS platforms. As used herein, the phrase "Profile Management Application" (PMA) refers to a software application, or a suite of software applications, installed on one or more processors, that is configured to execute any or all of the processes, subprocesses, methods, and/or algorithms described herein. Except where specifically described to the contrary, any portion of this functionality may be executed individually, separately, or in a different order from the other functionalities described herein.

Figure 6:
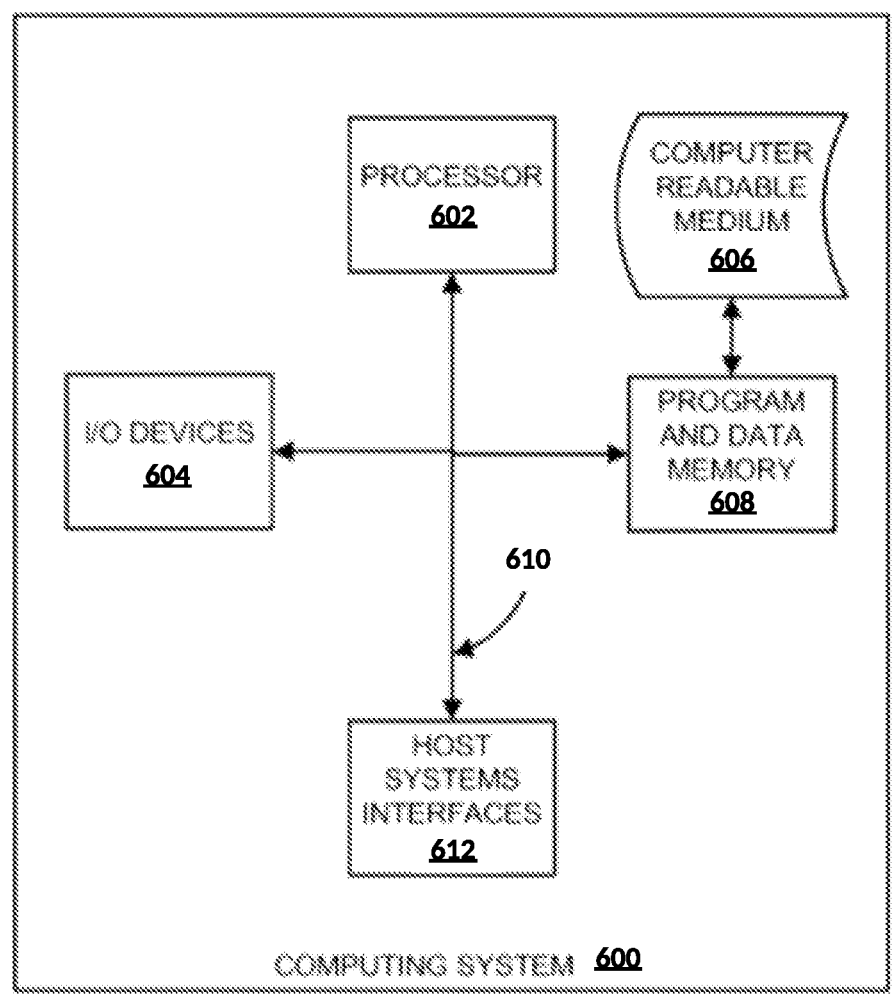
FIG. 6 is a block diagram of an exemplary computing system in which a computer readable medium provides instructions for performing methods described herein.

FIG. 6 illustrates a computing system 600, such as a profile management unit, in which a computer readable medium 606 may provide instructions for performing any of the methods disclosed herein. Furthermore, the invention can take the form of a computer program product accessible from the computer readable medium 606 providing program code for use by or in connection with a computer or any instruction execution system. For the purposes of this description, the computer readable medium 606 can be any apparatus that can tangibly store the program for use by or in connection with the instruction execution system, apparatus, or device, including the computer system 600.

The medium 606 can be any tangible electronic, magnetic, optical, electromagnetic, infrared, or semiconductor system (or apparatus or device). Examples of a computer readable medium 606 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 600, suitable for storing and/or executing program code, can include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution. Input/output (I/O) devices 604 (including but not limited to keyboards, displays, pointing devices, etc.) can be coupled to the system either directly or through intervening I/O controllers. Network adapters may also be coupled to the system to enable the computing system 600 to become coupled to other data processing systems, such as through host systems interfaces 612, or remote printers or storage devices through intervening private or public networks.

Modems, cable modem and Ethernet cards are just a few of the currently available types of network adapters.

Although specific features of various embodiments may be shown in some drawings and not in others, this is for convenience only. In accordance with the principles of the systems and methods described herein, any feature of a drawing may be referenced or claimed in combination with any feature of any other drawing.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and sub-combinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method of performing proactive network maintenance (PNM) on an active communication network comprising:
    monitoring performance data from the active communication network, wherein the performance data are collected from a plurality of modems sharing a channel of the active communication network;
    identifying an impairment of the active communication network through changes in the performance data;
    proposing a repair option for the impairment;
    quantifying an expected change in the performance data upon implementation of the repair option; and
    scheduling implementation of the repair option on the active communication network.

2. The method of claim 1, wherein the impairment is a developing impairment.

3. The method of claim 1, wherein scheduling is performed when the expected change in the performance data exceeds a service cost estimate by a set amount.

4. The method of claim 1, wherein the steps of proposing and quantifying are repeated for a plurality of repair options and the repair option that is implemented is the repair option that provides a largest beneficial expected change in the performance data.

5. The method of claim 1, wherein the step of quantifying the expected change comprises: (i) altering the performance data based on historical parameters, (ii) applying probabilistic filters to the performance data, (iii) using machine learning techniques to alter the performance data, (iv)

replacing segments of data within the performance data, (v) using data smoothing techniques or missing data replacement techniques, or (vi) combinations thereof.

6. The method of claim 1, wherein the performance data are selected from one or more of network capacity, channel capacity, modulation profile data, modulation error ratio (MER) data, signal-to-noise data, bandwidth demand, collision frequency, time of day, temperature, environmental conditions, location of a device, transience of a failure condition, carrier suppression and distortion.

7. The method of claim 1, wherein the repair option is a reassignment of modulation profiles, reassignment of user devices across a plurality of channels, hardware maintenance, hardware replacement, or combinations thereof.

8. The method of claim 1 further comprising prioritizing proactive network maintenance when multiple impairments are present.

9. The method of claim 8, wherein the prioritization is based on how much the expected change in the performance data exceeds the service cost estimate.

10. The method of claim 1, wherein the service cost estimate comprises one or more of equipment costs, labor costs, fuel costs, ability to bundle PNM work with other work tickets, service level agreement pricing, and ability to add new users to a channel.

11. A non-transitory computer-readable medium having a plurality of non-transitory instructions executable with a processor for performing proactive network maintenance (PNM) on an active communication network, the plurality of non-transitory instructions being executable for:
monitoring performance data from the active communication network, wherein the performance data are collected from a plurality of modems sharing a channel of the active communication network;
identifying an impairment of the active communication network through changes in the performance data;
proposing a repair option for the impairment;
quantifying an expected change in the performance data upon implementation of the repair option; and
scheduling implementation of the repair option on the active communication network.

12. The non-transitory computer-readable medium of claim 11, wherein the impairment is a developing impairment.

13. The non-transitory computer-readable medium of claim 11, wherein scheduling is performed when the expected change in the performance data exceeds a service cost estimate by a set amount.

14. The non-transitory computer-readable medium of claim 11, wherein the plurality of non-transitory instructions are further executable for repeating the steps of proposing and quantifying for a plurality of repair options and implementing the repair option that provides a largest beneficial expected change in the performance data.

15. The non-transitory computer-readable medium of claim 11, wherein the step of quantifying the expected change comprises: (i) altering the performance data based on historical parameters, (ii) applying probabilistic filters to the performance data, (iii) using machine learning techniques to alter the performance data, (iv) replacing segments of data within the performance data, (v) using data smoothing techniques or missing data replacement techniques, or (vi) combinations thereof.

16. The non-transitory computer-readable medium of claim 11, wherein the performance data are selected from one or more of network capacity, channel capacity, modulation profile data, modulation error ratio (MER) data, signal-to-noise data, bandwidth demand, collision frequency, time of day, temperature, environmental conditions, location of a device, transience of a failure condition, carrier suppression and distortion.

17. The non-transitory computer-readable medium of claim 11, wherein the repair option is a reassignment of modulation profiles, reassignment of user devices across a plurality of channels, hardware maintenance, hardware replacement, or combinations thereof.

18. The non-transitory computer-readable medium of claim 11, wherein the plurality of non-transitory instructions are further executable for prioritizing proactive network maintenance when multiple impairments are present.

* * * * *